(12) United States Patent
Fang et al.

(10) Patent No.: US 11,084,255 B2
(45) Date of Patent: Aug. 10, 2021

(54) FORMALDEHYDE-FREE UV BLOCKBOARD WITH ANTIBACTERIAL FUNCTION AND PREPARATION PROCESS THEREOF

(71) Applicant: Treezo New Material Science and Technology Group CO., Ltd, Zhejiang (CN)

(72) Inventors: Xuzheng Fang, Zhejiang (CN); Tonghua Lu, Zhejiang (CN); Haiming Bi, Zhejiang (CN); Hao Liu, Zhejiang (CN)

(73) Assignee: Treezo New Material Science and Technology Group CO., Ltd, Zhejiang (CN)

( * ) Notice: Subject to any disclaimer, the term of this patent is extended or adjusted under 35 U.S.C. 154(b) by 109 days.

(21) Appl. No.: 16/655,294

(22) Filed: Oct. 17, 2019

(65) Prior Publication Data
US 2020/0376818 A1 Dec. 3, 2020

(30) Foreign Application Priority Data

May 31, 2019 (CN) .......................... 201910467221.2

(51) Int. Cl.
*B32B 21/14* (2006.01)
*B27D 1/04* (2006.01)
*B32B 21/13* (2006.01)
*B32B 7/12* (2006.01)

(52) U.S. Cl.
CPC ................ *B32B 21/14* (2013.01); *B27D 1/04* (2013.01); *B32B 7/12* (2013.01); *B32B 21/13* (2013.01); *B32B 2255/08* (2013.01); *B32B 2255/26* (2013.01); *B32B 2255/28* (2013.01); *Y10T 428/25* (2015.01); *Y10T 428/254* (2015.01)

(58) Field of Classification Search
CPC ... Y10T 428/25; Y10T 428/254; B32B 21/14; B32B 21/13; B32B 7/12; B32B 2255/08; B32B 2255/26; B32B 2255/28; B27D 1/04
See application file for complete search history.

(56) References Cited

FOREIGN PATENT DOCUMENTS

| CN | 206902476 | 1/2018 |
|---|---|---|
| CN | 207700420 | 8/2018 |

OTHER PUBLICATIONS

Shi Liyi et al., "Morphology and photocatalytic activities of ultrafine TiO2 particles syn-thesized in high temperature aerosol reactor", Acta Scient IAE Circumstant IAE, Mar. 2000, pp. 134-138.

*Primary Examiner* — Catherine A. Simone
(74) *Attorney, Agent, or Firm* — JCIP Global Inc.

(57) ABSTRACT

The invention discloses a formaldehyde-free UV blockboard with an antibacterial function and a preparation process thereof. The blockboard sequentially includes a substrate, an antibacterial layer, and a UV cured layer. The antibacterial layer contains a formaldehyde-removing antibacterial microsphere, and the formaldehyde-removing antibacterial microsphere includes a nanoscale polymer hollow microsphere. A water-in-oil drop permeates into a center of the nanoscale polymer hollow microsphere, the water-in-oil drop includes a bamboo vinegar at an outer layer and an aqueous sodium hydroxide solution at an inner layer, and titanium dioxide aerosol particles are dispersed in the aqueous sodium hydroxide solution.

10 Claims, 1 Drawing Sheet

FORMALDEHYDE-FREE UV BLOCKBOARD WITH ANTIBACTERIAL FUNCTION AND PREPARATION PROCESS THEREOF

CROSS-REFERENCE TO RELATED APPLICATION

This application claims the priority benefit of China application serial no. 201910467221.2, filed on May 31, 2019. The entirety of the above-mentioned patent application is hereby incorporated by reference herein and made a part of this specification.

BACKGROUND OF THE INVENTION

Technical Field

The disclosure belongs to the field of blockboard production processes, and particularly relates to a formaldehyde-free UV blockboard with an antibacterial function and a preparation process thereof.

Description of Related Art

The veneer is a surface material for indoor decoration or furniture production. A natural timber or engineered wood is sliced into a sheet with a certain thickness, and the sheet is attached onto the surface of a plywood and hot-pressed to form the veneer. Melamine-impregnated film paper is usually attached onto the surface of the veneer to obtain a final blockboard product.

As the public's requirement for furniture environments is becoming higher and higher, China has accordingly issued the industrial standard of GBT/28995-2012 Decorative Paper for Wood-Based Panels, limiting the formaldehyde emission of melamine-impregnated film paper. However, the formaldehyde emission of veneers and melamine-impregnated film paper conventionally designed at present is often much higher than the aforementioned standard, which is unfavorable for the maintenance of the health of furniture environments.

In order to reduce the formaldehyde emission of blockboards, there are mainly two approaches of improvement at present.

(1) The Chinese utility model patent with the publication number CN 206902476 U discloses melamine-impregnated decorative adhesive film paper with low formaldehyde emission. The adhesive film paper includes a raw impregnated paper layer, and an adhesive layer and a surface layer arranged on the surfaces of both sides of the raw impregnated paper layer. The raw impregnated paper layer is attached to the surface of one side of a board through the adhesive layer, and the adhesive layer is a melamine-formaldehyde resin layer. A formaldehyde-absorbing layer is arranged between the adhesive layer and the raw impregnated paper layer, and a chitin layer is arranged between the board and the adhesive layer.

This technique utilizes the absorptive effect of the formaldehyde-absorbing layer and the chitin layer to absorb formaldehyde gas volatilized from the adhesive layer, to reduce the formaldehyde emission of the melamine-impregnated decorative adhesive film paper. However, the process of arranging the formaldehyde-absorbing layer is complex and high in cost. Moreover, the capability of chitin to purify formaldehyde is limited, and long-term purification can hardly be realized, so that the problem of formaldehyde emission cannot be fundamentally solved.

(2) The Chinese utility model patent with the publication number CN 207700420 U discloses a UV antibacterial fireproof board. The board includes a substrate, a heat transfer layer, an antibacterial layer, and a UV cured layer.

The board utilizes the UV cured layer facing instead of the conventional melamine-impregnated film paper. Irradiated by ultraviolet light, the adhesive film formed by a facing UV coating does not contain formaldehyde and other volatile organic compounds. However, the antibacterial layer in the board adopts a conventional organic or natural antibacterial agent, and whether the conventional organic antibacterial agent is safe or not is inconclusive yet, and the antibacterial property of the conventional natural antibacterial agent is poor.

SUMMARY OF THE INVENTION

The invention is directed to provide a formaldehyde-free UV blockboard with an antibacterial function and a preparation process thereof, and the formaldehyde-free UV blockboard has excellent antibacterial property and formaldehyde-adsorbing property.

According to the exemplary embodiments of the invention, the invention provides the following technical solutions:

A formaldehyde-free UV blockboard with an antibacterial function according to an embodiment of the invention sequentially includes a substrate, an antibacterial layer, and a UV cured layer. The antibacterial layer contains a formaldehyde-removing antibacterial microsphere, the formaldehyde-removing antibacterial microsphere includes a nanoscale polymer hollow microsphere, a water-in-oil drop permeates into a center of the nanoscale polymer hollow microsphere, the water-in-oil drop includes a bamboo vinegar at an outer layer and an aqueous sodium hydroxide solution at an inner layer, and titanium dioxide aerosol particles are dispersed in the aqueous sodium hydroxide solution.

According to an embodiment of the invention, the antibacterial layer is added with the formaldehyde-removing antibacterial microspheres and the formaldehyde-removing antibacterial microspheres are provided with water-in-oil drops. The bamboo vinegar at the outer layer not only can absorb volatile harmful gas (such as formaldehyde), but also can have broad-spectrum killing efficiency on both bacteria and fungi, and moreover, embedding by the nanoscale polymer hollow microspheres can prevent the evaporation of the bamboo vinegar, so that the efficacy duration of the bamboo vinegar can be effectively prolonged. The aqueous sodium hydroxide solution at the inner layer can quickly capture formaldehyde, the titanium dioxide aerosol particles therein can oxidize formaldehyde molecules captured by the aqueous sodium hydroxide solution, and the wrapping of the aqueous sodium hydroxide solution drops by the bamboo vinegar and the nanoscale polymer hollow microspheres can also effectively prolong the efficacy duration of the aqueous sodium hydroxide solution. A water phase and an oil phase function together to jointly realize the continuous purification of volatile harmful gas (such as formaldehyde) in home environments and the continuous killing and inhibition of harmful bacteria and fungi.

Moreover, the bamboo vinegar adopted in the antibacterial layer of the invention is a pure natural plant extract, which is environmentally friendly and nontoxic. Sodium hydroxide and titanium dioxide aerosols do not have any toxicity as well. Therefore, the whole blockboard is more environmentally friendly.

In the aforementioned formaldehyde-free UV blockboard with an antibacterial function, an average grain size of the nanoscale polymer hollow microsphere is 100-150 nm. Uniform and fine holes in the nanoscale polymer hollow microspheres not only enable the water-in-oil drops to conveniently and quickly permeate into the centers of the microspheres, but also enable the water-in-oil drops to conveniently and effectively adsorb and contact bacteria or fungi.

In the aforementioned formaldehyde-free UV blockboard with an antibacterial function, the nanoscale polymer hollow microsphere is a poly(methacrylic acid)-divinylbenzene hollow microsphere.

In the aforementioned formaldehyde-free UV blockboard with an antibacterial function, a concentration of the aqueous sodium hydroxide solution is 0.5 to 0.8 mol/L.

In the aforementioned formaldehyde-free UV blockboard with an antibacterial function, a grain size of the titanium dioxide aerosol particles is not greater than 50 nm. With such a grain size, the titanium dioxide aerosol particles have the highest efficiency in purifying formaldehyde, and moreover, the number of the water-in-oil drops permeating into the centers of the microspheres can be prevented from being reduced due to oversized water-in-oil drops.

In the aforementioned formaldehyde-free UV blockboard with an antibacterial function, in parts by mass, a material composition of the antibacterial layer includes 30 to 50 parts of water, 12 to 24 parts of the nanoscale polymer hollow microsphere, 4 to 8 parts of a water-in-oil system, 0.15 to 0.2 parts of a wetting agent, 0.2 to 0.6 parts of a dispersant, and 0.1 to 0.2 parts of a defoaming agent.

In the aforementioned formaldehyde-free UV blockboard with an antibacterial function, a material solution of the antibacterial layer can be obtained by the following operations:

(a) the water-in-oil system is prepared from the bamboo vinegar and the aqueous sodium hydroxide solution in which the titanium dioxide aerosol particles are dispersed;

(b) the nanoscale polymer hollow microsphere and the water-in-oil system are uniformly mixed according to a mass ratio of 3:1 and stirred for 2 to 3 hours, so that the water-in-oil drop permeates into the nanoscale polymer hollow microsphere to obtain a formaldehyde-removing antibacterial microsphere mother solution; and (c) according to preset parts by mass, the wetting agent, the dispersant and the defoaming agent are added into water and uniformly stirred, and then the formaldehyde-removing antibacterial microsphere mother solution is added to obtain the material solution of the antibacterial layer.

In the aforementioned formaldehyde-free UV blockboard with an antibacterial function, in percentages by mass, a material composition of the water-in-oil system includes: 5-6% of mineral oil, 1-2% of EM90 (cetyl polyethylene glycol/polypropylene glycol-10/1 dimethicone), 0.1-0.3% of Triton 100 (polyethylene glycol octylphenol ether), 1-2% of polyoxypropylene fatty alcohol ether, 1-2% of sorbitan isofatty acid ester, 25-30% of the bamboo vinegar, 40-50% of a sodium hydroxide solution, 10-15% of the titanium dioxide aerosol particles, 2-3% of urea, and 0.5-1% of magnesium sulfate. The magnesium sulfate and the urea are added into the sodium hydroxide solution and sufficiently dissolved, and then the titanium dioxide aerosol particles are added to obtain a water phase. The mineral oil, the EM90, the Triton 100, the polyoxypropylene fatty alcohol ether, the sorbitan isofatty acid ester and the bamboo vinegar are sufficiently uniformly mixed, and then heated to 35° C. to obtain an oil phase. Under violent stirring, the water phase is slowly added into the oil phase and homogenized for 50 to 60 minutes to obtain the water-in-oil system.

A preparation process for the formaldehyde-free UV blockboard with an antibacterial function according to an embodiment of the invention includes the following steps:

(1) spraying the material solution of the antibacterial layer evenly onto a surface of the substrate and curing until the surface becomes dry; and (2) continuing to spray a UV coating onto the substrate with two coats of primer and three coats of paint, and curing for 20 to 30 hours after the spraying is completed to obtain the formaldehyde-free UV blockboard with an antibacterial function.

In an exemplary embodiment, in the aforementioned steps of the preparation process for the formaldehyde-free UV blockboard with an antibacterial function, a usage amount of the material solution of the antibacterial layer is 6 to 10 g/m$^2$.

Compared with the related art, beneficial effects of the invention are as follows.

(1) According to the invention, the antibacterial layer is added with the formaldehyde-removing antibacterial microspheres, and the formaldehyde-removing antibacterial microspheres are provided with water-in-oil drops. The bamboo vinegar at the outer layer not only can absorb volatile harmful gas (such as formaldehyde), but also can have broad-spectrum killing efficiency on both bacteria and fungi. Moreover, embedding by the nanoscale polymer hollow microspheres can prevent the evaporation of the bamboo vinegar, so that the efficacy duration of the bamboo vinegar can be effectively prolonged. The aqueous sodium hydroxide solution at the inner layer can quickly capture formaldehyde, the titanium dioxide aerosol particles therein can oxidize formaldehyde molecules captured by the aqueous sodium hydroxide solution, and the wrapping of the aqueous sodium hydroxide solution drops by the bamboo vinegar and the nanoscale polymer hollow microspheres can also effectively prolong the efficacy duration of the aqueous sodium hydroxide solution. The water phase and the oil phase function together to jointly realize the continuous purification of volatile harmful gas (such as formaldehyde) in home environments and the continuous killing and inhibition of harmful bacteria and fungi.

(2) The bamboo vinegar adopted in the antibacterial layer of the invention is a pure natural plant extract, which is environmentally friendly and nontoxic. Sodium hydroxide and titanium dioxide aerosols do not have any toxicity as well. Therefore, the whole blockboard is more environmentally friendly.

DESCRIPTION OF THE EMBODIMENTS

The invention is further illustrated in detail hereinafter in connection with accompanying drawings and specific embodiments.

Embodiment 1

Figure 1:
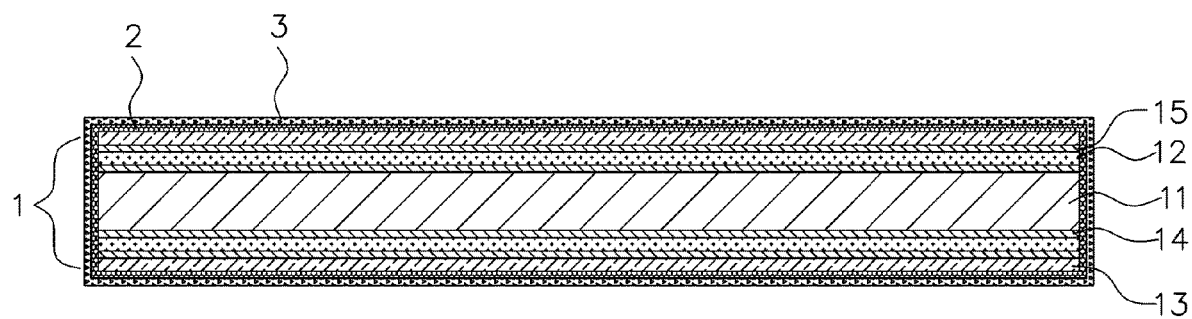
FIG. 1 is a schematic structural diagram of a formaldehyde-free UV blockboard with an antibacterial function according to an embodiment of the invention.

As shown in FIG. 1, a formaldehyde-free UV blockboard with an antibacterial function according to the present embodiment sequentially includes a substrate 1, an antibacterial layer 2, and a UV cured layer 3.

The substrate 1 sequentially includes a blockboard layer 11, a first adhesive layer 14, a poplar veneering layer 12, a second adhesive layer 15, and an Okoume board layer 13, and in order to fundamentally reduce the formaldehyde emission of the blockboard. In the present embodiment, both the first adhesive layer 14 and the second adhesive layer 15 adopt soybean glue.

Figure 2:
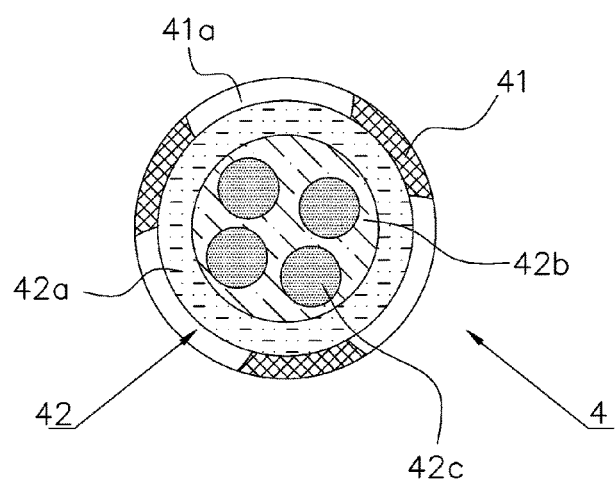
FIG. 2 is a schematic structural diagram of a formaldehyde-removing antibacterial microsphere in the antibacterial layer in FIG. 1.

As shown in FIG. 2, the antibacterial layer 2 contains formaldehyde-removing antibacterial microspheres 4. The formaldehyde-removing antibacterial microsphere 4 includes a nanoscale polymer hollow microsphere 41. A water-in-oil drop 42 permeates into the center via the hole of the nanoscale polymer hollow microsphere 41. The water-in-oil drop 42 includes a bamboo vinegar at an outer layer and an aqueous sodium hydroxide solution at an inner layer. Titanium dioxide aerosol particles 42c are dispersed in the aqueous sodium hydroxide solution.

The nanoscale polymer hollow microspheres 41 adopted in the present embodiment are poly(methacrylic acid)-divinylbenzene hollow microspheres having an average grain size of about 100-150 nm. The uniform and fine holes provided on the surface of the nanoscale polymer hollow microsphere 41 not only enable the water-in-oil drop 42 to conveniently and quickly permeate into the center of the microsphere, but also enable the water-in-oil drop 42 to conveniently and effectively adsorb the contacted bacteria or fungi.

In the water-in-oil drop 42, a bamboo vinegar layer 42a not only can absorb volatile harmful gas (such as formaldehyde), but also has broad-spectrum killing efficiency on both bacteria and fungi. An aqueous sodium hydroxide solution drop 42b at the inner side can quickly capture formaldehyde, and the titanium dioxide aerosol particles 42c therein can oxidize formaldehyde molecules captured by the aqueous sodium hydroxide solution drop 42b.

The grain size of the titanium dioxide aerosol particles 42c adopted in the present embodiment should not be greater than 50 nm, and is, for example, between 20 nm and 30 nm to facilitate permeation into the center of the nanoscale polymer hollow microsphere 41. The titanium dioxide aerosol particle 42c can be prepared by referring to the method disclosed by the literature (Shi et al. Morphology and Photocatalytic Activities of Ultrafine $TiO_2$ Particles Synthesized in High Temperature Aerosol Reactor [J]. Journal of Environmental Sciences, 2000, 20(2): 134-138).

The preparation process for the formaldehyde-free UV blockboard with an antibacterial function includes the following steps.

(1) A material solution of the antibacterial layer 2 is evenly sprayed onto the surface of the substrate 1, where the usage amount of the material solution of the antibacterial layer 2 is 8 g/m², and curing is performed for 6 hours until the surface becomes dry.

The substrate 1 is obtained by the following method.

(A) The surface of the blockboard is cleaned (for example, by puttying and surface sanding), so that the surface of the blockboard becomes even and flawless.

(B) Soybean glue is applied to the poplar veneer and then the poplar veneer is put onto the blockboard, and the poplar veneer is adhered to the blockboard by hot-pressing, where the pressure of hot-pressing is 1.0 MPa, the temperature of hot-pressing is 140° C., and the duration of hot-pressing is 120 seconds.

(C) The Okoume veneer is attached to the surface of the poplar veneer, where the pressure of attaching is 1.0 MPa, the temperature of attaching is 120° C., and the duration of attaching is 7 minutes.

The material solution for the antibacterial layer 2 is obtained by the following method.

(a) A water-in-oil system is prepared.

In percentages by weight, the material composition of the water-in-oil system includes 6% of mineral oil, 2% of EM90 (cetyl polyethylene glycol/polypropylene glycol-10/1 dimethicone), 0.2% of Triton 100 (polyethylene glycol octylphenol ether), 2% of polyoxypropylene fatty alcohol ether, 1.8% of sorbitan isofatty acid ester, 28% of bamboo vinegar, 44% of sodium hydroxide solution, 12% of titanium dioxide aerosol particles, 3% of urea, and 1% of magnesium sulfate.

The preparation method for the water-in-oil system is as follows: magnesium sulfate and urea are added into the sodium hydroxide solution and sufficiently dissolved, and then the titanium dioxide aerosol particles are added to obtain a water phase; the mineral oil, EM90, Triton 100, polyoxypropylene fatty alcohol ether, sorbitan isofatty acid ester and the bamboo vinegar are sufficiently uniformly mixed and heated to 35° C. to obtain an oil phase; and under violent stirring, the water phase is slowly added into the oil phase and homogenized for 60 minutes to obtain the water-in-oil system.

(b) 15 parts of the nanoscale polymer hollow microspheres and 5 parts of the water-in-oil system are uniformly mixed, so that the water-in-oil drops permeate into the nanoscale polymer hollow microspheres to obtain a formaldehyde-removing antibacterial microsphere mother solution.

(c) 0.15 parts of wetting agent, 0.4 parts of dispersant and 0.15 parts of defoaming agent are added into 35 parts of water, and after uniform stirring, the formaldehyde-removing antibacterial microsphere mother solution is added to obtain the material solution of the antibacterial layer 2.

(2) The substrate 1 is sent into UV spraying equipment to continue to spray a UV coating onto the substrate 1 with two coats of primer and three coats of paint, and after spraying of the last coat is completed, curing is performed for 24 hours to obtain the formaldehyde-free UV blockboard with an antibacterial function according to the present embodiment.

In the above step of the present embodiment, the UV coating may be sprayed onto the substrate 1 by using the technique of two coats of primer and three coats of paint. Specifically, a first coat of primer is applied and polished, and then a second coat of primer is applied. Next, three coats of paint are sequentially applied thereon, and polishing may be performed before each coat of paint is applied. However, the invention is not limited to the technique of two coats of primer and three coats of paint.

Comparative Embodiment 1

A formaldehyde-free UV blockboard with an antibacterial function in the present embodiment sequentially includes a substrate 1, an antibacterial layer 2, and a UV cured layer 3. The substrate 1 sequentially includes a blockboard layer 11, a first adhesive layer 14, a poplar veneer layer 12, a second adhesive layer 15, and an Okoume board layer 13; and the preparation process includes the following steps.

(1) A material solution of the antibacterial layer 2 is evenly sprayed onto the surface of the substrate 1, the usage amount of the material solution of the antibacterial layer 2 is 8 g/m², and curing is performed for 6 hours until the surface becomes dry.

The substrate 1 includes a blockboard layer 11, a poplar veneer layer 12, and an Okoume board layer 13, and is obtained by the following method.

(A) The surface of the blockboard is cleaned (for example, by puttying and surface sanding), so that the surface of the blockboard becomes even and flawless.

(B) Soybean glue is applied to the poplar veneer and then the poplar veneer is put onto the blockboard, and the poplar veneer is adhered to the blockboard by hot-pressing, where the pressure of hot-pressing is 1.0 MPa, the temperature of hot-pressing is 140° C., and the duration of hot-pressing is 120 seconds.

(C) The Okoume veneer is attached to the surface of the poplar veneer, where the pressure of attaching is 1.0 MPa, the temperature of attaching is 120° C., and the duration of attaching is 7 minutes.

The material solution of the antibacterial layer 2 is obtained by the following method.

(a) 15 parts of the nanoscale polymer hollow microspheres and 5 parts of the water-in-oil system are uniformly mixed, so that the water-in-oil drops permeate into the nanoscale polymer hollow microspheres to obtain a formaldehyde-removing antibacterial microsphere mother solution.

(b) 0.15 parts of wetting agent, 0.4 parts of dispersant and 0.15 parts of defoaming agent are added into 35 parts of water, and after uniform stirring, the formaldehyde-removing antibacterial microsphere mother solution is added to obtain the material solution of the antibacterial layer 2.

(2) The substrate 1 is sent into UV spraying equipment to continue to spray a UV coating onto the substrate 1 with two coats of primer and three coats of paint, and after spraying of the last coat is completed, curing is performed for 24 hours to obtain the formaldehyde-free UV blockboard with an antibacterial function according to the present comparative embodiment.

Comparative Embodiment 2

A formaldehyde-free UV blockboard with an antibacterial function in the present embodiment sequentially includes a substrate 1, an antibacterial layer 2, and a UV cured layer 3. The substrate 1 sequentially includes a blockboard layer 11, a first adhesive layer 14, a poplar veneer layer 12, a second adhesive layer 15, and an Okoume board layer 13; and the preparation process includes the following steps.

(1) Bamboo vinegar is evenly sprayed onto the surface of the substrate 1, where the usage amount of the bamboo vinegar is 8 g/m², and curing is performed for 6 hours until the surface becomes dry.

The substrate 1 includes a blockboard layer 11, a poplar veneer layer 12, and an Okoume board layer 13, and is obtained by the following method.

(A) The surface of the blockboard is cleaned (for example, by puttying and surface sanding), so that the surface of the blockboard becomes even and flawless.

(B) Soybean glue is applied to the poplar veneer and then the poplar veneer is put onto the blockboard, and the poplar veneer is adhered to the blockboard by hot-pressing, where the pressure of hot-pressing is 1.0 MPa, the temperature of hot-pressing is 140° C., and the duration of hot-pressing is 120 seconds.

(C) The Okoume veneer is attached to the surface of the poplar veneer, where the pressure of attaching is 1.0 MPa, the temperature of attaching is 120° C., and the duration of attaching is 7 minutes.

(2) The substrate 1 is sent into UV spraying equipment, to continue to spray a UV coating onto the substrate 1 with two coats of primer and three coats of paint, and after spraying of the last coat is completed, curing is performed for 24 hours to obtain the formaldehyde-free UV blockboard with an antibacterial function according to the present comparative embodiment.

The formaldehyde emissions of the blockboards of embodiment 1 and comparative embodiments 1 and 2 are tested according to GB/T 5849-2006 Blockboards. The formaldehyde purification efficiency and formaldehyde purification effect persistence of each blockboard are tested according to JCT 1074-2008 Purificatory Performance of Coatings with Air Purification. The test results are shown in Table 1. The antibacterial and mildew-proof effect of each blockboard is tested according to the antibacterial testing standard JC/T 2039-2010 Antibacterial and Mildew-proof Wooden Boards for Decoration, and the test results are shown in Table 2.

TABLE 1

| Tested items | Formaldehyde emission | Formaldehyde purification efficiency | Formaldehyde purification effect persistence |
| --- | --- | --- | --- |
| Embodiment 1 | 0.05 mg/L | 95% | 90% |
| Comparative Embodiment 1 | 0.5 mg/L | 78% | 64% |
| Comparative Embodiment 2 | 0.5 mg/L | 76% | 53% |

TABLE 2

| | Antibacterial and mildew-proof performance | | Antibacterial and mildew-proof durability | |
| --- | --- | --- | --- | --- |
| Tested items | Antibacterial rate | Mildew-proof level | Antibacterial rate | Mildew-proof level |
| Embodiment 1 | 99% | Level 0 | 98% | Level 0 |
| Comparative Embodiment 1 | 97% | Level 0 | 93% | Level 0 |
| Comparative Embodiment 2 | 97% | Level 0 | 81% | Level 2 |

What is claimed is:

1. A formaldehyde-free UV blockboard with an antibacterial function, sequentially comprising a substrate, an antibacterial layer, and a UV cured layer, wherein the antibacterial layer contains a formaldehyde-removing antibacterial microsphere, the formaldehyde-removing antibacterial microsphere comprises a nanoscale polymer hollow microsphere, a water-in-oil drop permeates into a center of the nanoscale polymer hollow microsphere, the water-in-oil drop comprises a bamboo vinegar at an outer layer and an aqueous sodium hydroxide solution at an inner layer, and titanium dioxide aerosol particles are dispersed in the aqueous sodium hydroxide solution.

2. The formaldehyde-free UV blockboard with an antibacterial function according to claim 1, wherein an average grain size of the nanoscale polymer hollow microsphere is 100-150 nm.

3. The formaldehyde-free UV blockboard with an antibacterial function according to claim 2, wherein the nanoscale polymer hollow microsphere is a poly(methacrylic acid)-divinylbenzene hollow microsphere.

4. The formaldehyde-free UV blockboard with an antibacterial function according to claim 1, wherein a concentration of the aqueous sodium hydroxide solution is 0.5-0.8 mol/L.

5. The formaldehyde-free UV blockboard with an antibacterial function according to claim 1, wherein a grain size of the titanium dioxide aerosol particles is not greater than 50 nm.

6. The formaldehyde-free UV blockboard with an antibacterial function according to claim 1, wherein in parts by mass, a material composition of the antibacterial layer comprises 30 to 40 parts of water, 12 to 24 parts of the nanoscale polymer hollow microsphere, 4 to 8 parts of a water-in-oil system, 0.15 to 0.2 parts of a wetting agent, 0.2 to 0.6 parts of a dispersant, and 0.1 to 0.2 parts of a defoaming agent.

7. The formaldehyde-free UV blockboard with an antibacterial function according to claim 6, wherein a material solution of the antibacterial layer is obtained by operations below:
  (a) the water-in-oil system is prepared from the bamboo vinegar and the aqueous sodium hydroxide solution in which the titanium dioxide aerosol particles are dispersed;
  (b) the nanoscale polymer hollow microsphere and the water-in-oil system are uniformly mixed according to a mass ratio of 3:1 and stirred for 2 to 3 hours, so that the water-in-oil drop permeates into the nanoscale polymer hollow microsphere to obtain a formaldehyde-removing antibacterial microsphere mother solution; and
  (c) according to preset parts by mass, the wetting agent, the dispersant and the defoaming agent are added into water and uniformly stirred, and then the formaldehyde-removing antibacterial microsphere mother solution is added to obtain the material solution of the antibacterial layer (2).

8. The formaldehyde-free UV blockboard with an antibacterial function according to claim 7, wherein in percentages by mass, a material composition of the water-in-oil system comprises:
  5-6% of mineral oil, 1-2% of cetyl polyethylene glycol/polypropylene glycol-10/1 dimethicone, 0.1-0.3% of polyethylene glycol octylphenol ether, 1-2% of polyoxypropylene fatty alcohol ether, 1-2% of sorbitan isofatty acid ester, 25-30% of the bamboo vinegar, 40-50% of a sodium hydroxide solution, 10-15% of the titanium dioxide aerosol particles, 2-3% of urea, and 0.5-1% magnesium sulfate, wherein
  the magnesium sulfate and the urea are added into the sodium hydroxide solution and sufficiently dissolved, and then the titanium dioxide aerosol particles are added to obtain a water phase,
  the mineral oil, the cetyl polyethylene glycol/polypropylene glycol-10/1 dimethicone, the polyethylene glycol octylphenol ether, the polyoxypropylene fatty alcohol ether, the sorbitan isofatty acid ester and the bamboo vinegar are sufficiently uniformly mixed, and then heated to 35° C. to obtain an oil phase, and
  under violent stirring, the water phase is slowly added into the oil phase and homogenized for 50 to 60 minutes to obtain the water-in-oil system.

9. A preparation process for the formaldehyde-free UV blockboard with an antibacterial function according to claim 7, comprising steps below:
  (1) spraying the material solution of the antibacterial layer evenly onto a surface of the substrate and curing until the surface becomes dry; and
  (2) continuing to spray a UV coating onto the substrate with two coats of primer and three coats of paint, and curing for 20 to 30 hours after the spraying is completed to obtain the formaldehyde-free UV blockboard with an antibacterial function.

10. The preparation process for the formaldehyde-free UV blockboard with an antibacterial function according to claim 9, wherein in step (1), a usage amount of the material solution of the antibacterial layer is 6 to 10 g/m$^2$.

\* \* \* \* \*